United States Patent
Yeo et al.

(10) Patent No.: US 11,010,772 B2
(45) Date of Patent: May 18, 2021

(54) SALES FORECASTING USING BROWSING RATIOS AND BROWSING DURATIONS

(71) Applicant: Adobe Inc., San Jose, CA (US)

(72) Inventors: Jinyoung Yeo, Pohang-si (KR); Nedim Lipka, Santa Clara, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1173 days.

(21) Appl. No.: 15/161,810

(22) Filed: May 23, 2016

(65) Prior Publication Data

US 2017/0337572 A1    Nov. 23, 2017

(51) Int. Cl.
*G06Q 30/00*    (2012.01)
*G06Q 30/02*    (2012.01)
*H04L 29/08*    (2006.01)

(52) U.S. Cl.
CPC ..... *G06Q 30/0202* (2013.01); *G06Q 30/0201* (2013.01); *H04L 67/02* (2013.01); *H04L 67/22* (2013.01)

(58) Field of Classification Search
CPC ........... G06Q 30/0202; G06Q 30/0201; H04L 67/02; H04L 67/22
USPC ....................................................... 705/7.31
See application file for complete search history.

(56) References Cited

U.S. PATENT DOCUMENTS

| | | | | |
|---|---|---|---|---|
| 9,104,960 B2* | 8/2015 | Bottou | ............... | G06Q 30/0242 |
| 9,916,538 B2* | 3/2018 | Zadeh | ..................... | G06K 9/627 |
| 10,387,936 B2* | 8/2019 | Ghose | ................. | G06F 16/9535 |
| 2005/0096963 A1* | 5/2005 | Myr | ................. | G06Q 10/06375 |
| | | | | 705/7.35 |
| 2008/0162269 A1* | 7/2008 | Gilbert | ............... | G06Q 30/0202 |
| | | | | 705/7.31 |
| 2008/0313247 A1* | 12/2008 | Galvin | .................. | G06F 16/951 |
| | | | | 708/200 |
| 2014/0324533 A1* | 10/2014 | Magnaghi | .......... | G06Q 30/0202 |
| | | | | 705/7.31 |

OTHER PUBLICATIONS

Bhagat,"Maximizing Product Adoption in Social Networks", In WSDM, 2012, Feb. 8, 2012, 10 pages.
Byers,"Daily Deals: Prediction, Social Diffusion, and Reputational Ramifications", In WSDM, 2012, Sep. 7, 2011, 10 pages.
Goyal,"A DataBased Approach to Social Influence Maximization", In VLDB, 2011, Sep. 30, 2011, 12 pages.

* cited by examiner

*Primary Examiner* — David J Stoltenberg
*Assistant Examiner* — Michael I Ezewoko
(74) *Attorney, Agent, or Firm* — FIG. 1 Patents

(57) ABSTRACT

Sales Forecasting using Browsing Ratios and Browsing Durations is described. In one or more implementations, browsing ratios representative of how much users visited webpages associated with a product or service, and browsing durations representing how much time users spent visiting the webpages associated with the product or service are determined. Based on the determined browsing ratios and browsing durations, a sales forecast of the product or service can be accurately determined.

20 Claims, 7 Drawing Sheets

500

$$P_*(\text{ADOPT}|\mathcal{H}^1_{c,p}, \mathcal{H}^2_{c,p}) = P_*(\text{ADOPT}|\mathcal{H}^1_{c,p})P_*(\text{ADOPT}|\mathcal{H}^2_{c,p})/P_*(\text{ADOPT})$$

220   208   216   502

SALES FORECASTING USING BROWSING RATIOS AND BROWSING DURATIONS

BACKGROUND

Accurate sales forecasting of products or services is used to increase efficiency in how business operations are conducted. Sales forecasting, for instance, can enable an e-commerce website to effectively manage operation of the website, supply chains, inventories, marketing activities, sales staff, and so forth. Accordingly, accuracy of sales forecasts also promotes accuracy of these operations.

Conventional techniques used to forecast sales of products and services, however, rely on simple calculations based solely on customers' purchase histories to forecast sales. This often leads to unsatisfactory results due to the conventional techniques' simplistic algorithms.

For example, a conventional sales forecasting model may forecast sales of a product or service by comparing a number of customers who purchased the product against a total number of customers that visited a webpage associated with the product. This may cause inaccuracies in a forecast of sales for the product or service because many of those customers may have visited the website without ever intending to make a purchase, i.e., "window-shoppers." Failure to account for window-shoppers may skew results and thus result in an inability to accurately determine who is actually likely to purchase a product. Since window-shopper traffic changes frequently, the sales forecasts that fail to account for "window-shopper" traffic often fail to produce accurate sales forecasts, which in turn, can negatively affect control of business operations.

SUMMARY

Sales forecasting techniques and systems are described that use browsing ratios and browsing durations. In one or more implementations, browsing histories for users that have visited webpages of a website are collected. From the browsing histories, a browsing ratio and a browsing duration are determined. The browsing ratio is based on a number of the webpages that are visited that pertain to a product or service and a number of the webpages that are visited that do not pertain to the product or service. The browsing duration describes an amount of time spent visiting the plurality of webpages. A forecast of sales of the product or service or another product or service that is related to the product or service is then determined based, at least in part, on the browsing ratio or the browsing duration.

In one or more implementations, a system includes one or more modules implemented at least partially in hardware. One of these modules includes a browsing ratio module that is configured to determine browsing ratios for a plurality of users based on a number of times each of the users, described in browsing data, visited a webpage of a website that pertains to a product or service and a number of times each of the users visited other webpages of the website that do not pertain to the product or service. Another one of these modules includes a browsing duration module that is configured to measure browsing durations for each of the users based on respective times spent by each of the users visiting the webpage that pertains to the product. A third module is configured as a sales forecasting module that forecasts sales of the product or service or a related product or service based on the plurality of browsing ratios and browsing durations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
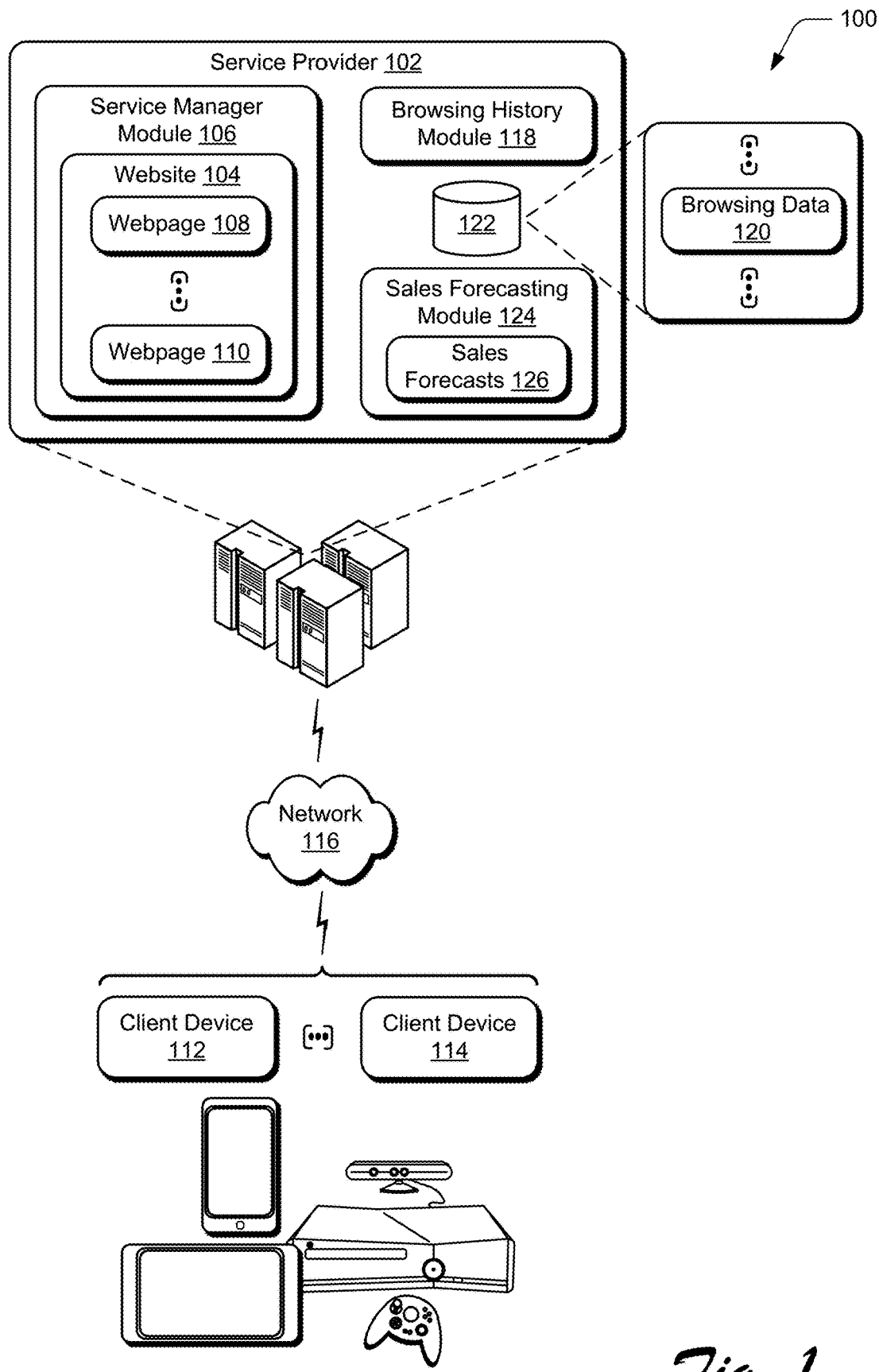
FIG. 1 is an illustration of an environment in an example implementation that is operable to employ sales forecasting techniques described herein.

Conventional techniques that are utilized to forecast sales of products and services associated with webpages may lack sufficient accuracy to be useful as a basis to control business operations corresponding to the products or services. This may be caused by an inability of these conventional techniques to account for browsing intentions of web traffic, i.e. whether or not users who visit the webpages are visiting with intent to purchase the associated products or services or are merely "window-shoppers." For example, conventional techniques may rely on a number of times users visit a webpage versus other webpages or a ratio of purchases to a number of users who visited an associated webpage. Because these techniques fail to account for browsing intentions of the users, these techniques tend to confuse "window-shoppers" as potential purchasers. This can lead to underestimated sales forecasts that can have effects on supply chains, inventories, marketing activities, sales staff, configuration of the website itself, and so forth.

Sales forecasting techniques and systems are described. These techniques forecast sales of products or services based on browsing histories of users along with assumptions as to their browsing intentions. Although browsing intentions are not directly observable (i.e., hidden), estimations of browsing intentions may be determined based on browsing ratios and browsing durations. Estimation of browsing intentions through browsing ratios and browsing durations allows the sales forecasting techniques to differentiate "window-shoppers" from users that are likely to purchase products as further described below. In this way, sales forecasts may be made with increased accuracy over conventional techniques by utilizing browsing ratios and browsing durations.

A browsing ratio is based on a number of times a user has visited a webpage of a website that corresponds to a product or service and a number of times the user has visited other webpages of the website that do not correspond to the product or service. For example, if a user views a product significantly more than other products of the website, the user is more likely to purchase the product. Although conventional techniques may leverage webpage browsing frequency to forecast sales, this frequency, alone, is not sufficient to establish browsing intent because this fails to take into account the actual user interaction with these webpages but rather merely relies on an observation that the webpage was visited. This may lead to inaccurate forecasts as discussed above. Thus, the sales forecasting techniques utilize browsing ratios in combination with browsing durations to establish sales forecasts.

A browsing duration, as described herein, corresponds to an amount of time between when the user first visited a webpage that relates to a product or service and either purchased the product or service or stopped visiting the webpage. Users typically take anywhere from a few hours to a few days from initially browsing products or services until ultimately purchasing the product or service or lose interest and cease to view the product or service. Conventional techniques may use an average time spent per page visit to forecast sales. Although this data may allow for a sales estimation for a single page visit, it simply cannot be used to predict when a user will finally make a purchase in the future. Therefore, browsing durations are used as part of the sales forecasting techniques to establish browsing intent and thus, accurately forecast sales by determining predicted future behavior.

As discussed above, in order to estimate browsing intent and thus, remove "window-shoppers" as potential purchasers, browsing ratios are combined with browsing durations to create a forecast model. For example, browsing ratios and browsing durations are calculated for a group of users that visit a webpage associated with a product or service. In some embodiments, the forecast model utilizes the determined browsing ratios and browsing durations for the group of users to create browsing ratio and browsing duration probabilities. The browsing ratio and browsing duration probabilities are combined into combined probabilities that are used in conjunction with a number of active users on the webpage (users that have visited the webpage) to forecast sales of the product.

By combining browsing ratios and browsing durations, a sales forecast model can be generated that is able to account for browsing intent, and thus accurately forecast sales by accounting for "window-shoppers," which is not accomplished in conventional methods. A variety of other examples are also contemplated as further described below.

In the following discussion, an example environment is first described that may employ the sales forecasting techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the sales forecasting techniques described herein. The illustrated environment 100 includes a service provider 102 that is configured to communicate with a website 104 through a service manager module 106. The service manager module 106 is representative of functionality to monitor traffic of the website 104 and extract data for use by the service provider 102. The website 104 contains a plurality of webpages, for example webpages 108, 110. The website 104 may comprise an e-commerce website with the plurality of webpages associated with products or services for sale.

Client devices 112, 114 interact with service provider 102 via network 116 such that the client devices are able to browse the webpages 108, 110 of the website 104. Client devices 112, 114, may be used by individual users or multiple users without departing from the scope of the disclosure.

A user of client device 112, for instance, may access the service provider 102 to view the webpages of the website 104. As part of the access, a browsing history module 118 captures browsing data 120 for the user by monitoring navigation of the user through the different webpages of the website 104. For example, browsing data 120 may contain histories of webpage visits by the user including numbers of webpage visits, times of webpage visits, whether or not the user purchased associated products with the webpages, and the like. The browsing history module 118 may thus capture browsing data 120 for a plurality of users that have visited respective webpages 108, 110 of the website 104.

The browsing data 120 is illustrated as stored within storage medium 122 for use by the sales forecasting module 124 to predict sales forecasts 126 for products or services associated with the webpages 108, 110 of the website 104. For example, the sales forecasting module 124 may produce a sales forecast for a product or service associated with webpage 108 based on browsing data 120. The sale forecast is produced in a manner that differentiates users that are likely to purchase the product or service from "window shoppers" that do not intend to purchase the product or service. This is performed in the following through determination of browsing ratios and browsing durations from the browsing data 120 that in turn are used to produce the sales forecast for the product. In this way, the sales forecast exhibits increased accuracy as based on users that are likely to purchase to product or service. Aspects of browsing data 120 and the sales forecasting module 124 are discussed further with reference to FIGS. 2-4 and 7.

Although shown external to the service manager module 104, the browsing history module 118 and the sales forecasting module 124 may be implemented in a variety of ways. Examples of which include on the website 104 itself, as stand-alone applications on one or more computing devices local or remote to the website 104, remotely to the service provider 102 via a web service that is accessible "on the cloud" via the network 116 or another network, within the service manager module 106, and so on.

Figure 2:
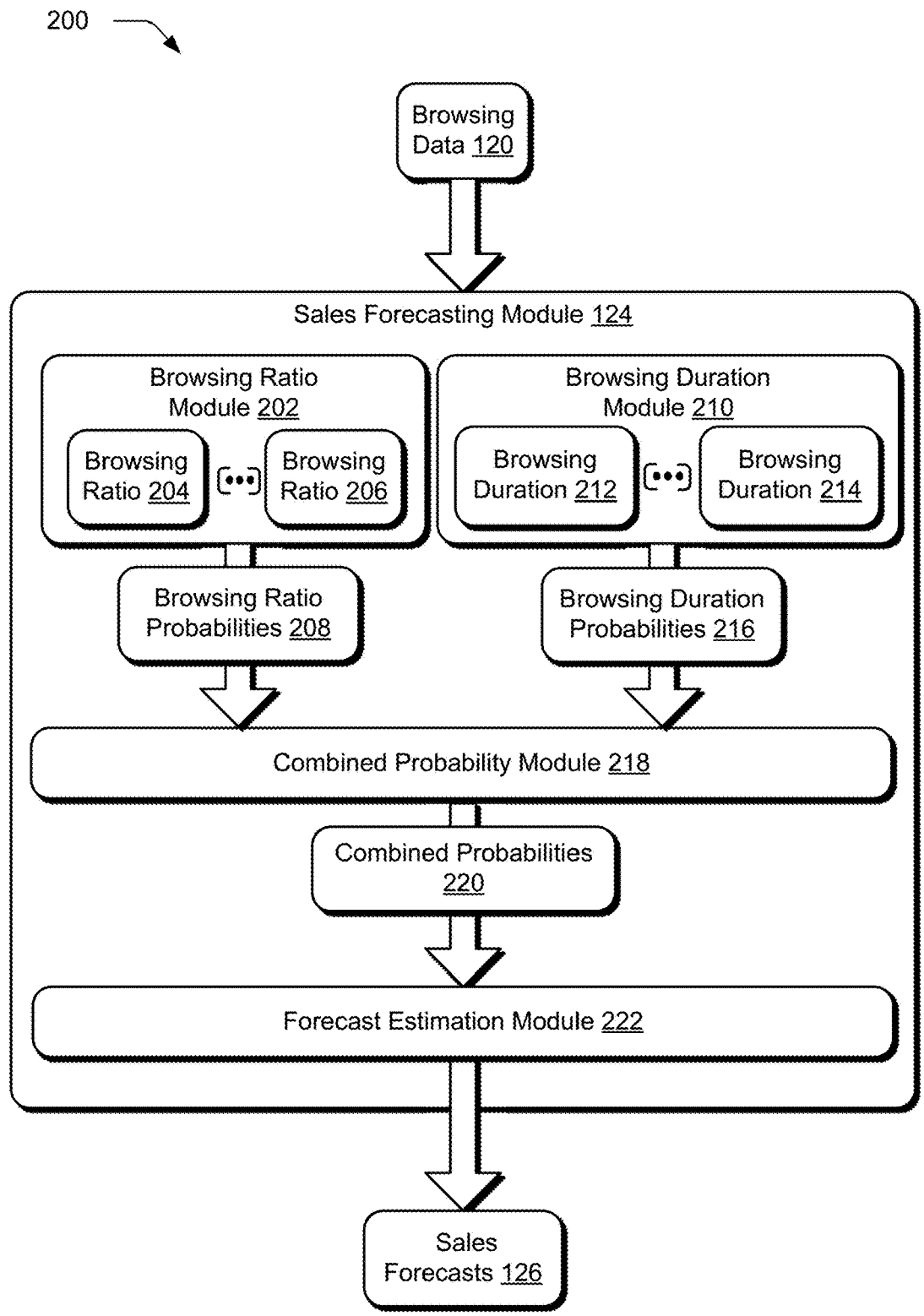
FIG. 2 depicts a sales forecasting module of FIG. 1 in greater detail.

FIG. 2 depicts a system 200 in an example implementation showing operation of the sales forecasting module 124 of FIG. 1 in greater detail. The sales forecasting module 124 receives browsing data 120 from the browsing history module 118 of FIG. 1. The browsing history module 118 as previously described is implemented at least partially in hardware to monitor user interaction with webpages 108, 110 of the website and form browsing data 120 that describes this interaction. The sale forecasting module 124 is implemented at least partially in hardware to produce sales forecasts 126 for products or services of the webpages 108, 110 of the website 104 from the browsing data 120.

To do so, the sales forecasting module 124 employs a browsing ratio module 202. The browsing ratio module 202, that is implemented at least partially in hardware, receives browsing data 120 and determines browsing ratios for each of the users respective to each of the webpages 108, 110, examples of which are illustrated as browsing ratio 204 and browsing ratio 206. Again, a browsing ratio is based on an amount a user visits a webpage that corresponds to a product or service and an amount a user visits webpages that does not correspond to the product or service. For instance, browsing ratio 204 corresponds to a browsing ratio for a first user respective to webpage 108. Thus, browsing ratio 204 may be based on an amount the first user visits webpage 108 and an amount the first user visits other webpages of the website 104. Browsing ratio 206 may correspond to the first user with respect to visiting webpage 110 or may correspond to another user with respect to any of the webpages 108, 110.

The browsing ratio module 202 then creates browsing ratio probabilities 208 for each user respective to each webpage. Browsing ratio probabilities 208 are indicative of likelihoods that active users will purchase products or services associated with the webpages. Browsing ratios determined from the browsing data 120 are considered analogous to browsing ratio probabilities 208, thus a browsing ratio becomes a browsing probability. For instance, each of the users that have visited webpage 108 will have browsing ratios associated with webpage 108. If a user visits webpage 108 more than other webpages of the website 104, a higher browsing ratio for that user will be determined, which then becomes a higher browsing ratio probability relative to the product.

The sales forecasting module 124 also includes a browsing duration module 210. The browsing duration module 210 receives browsing data 120 and is implemented at least partially in hardware to determine browsing durations for each of the users respective to each of the webpages, examples of which are illustrated as browsing durations 212, 214. Again, a browsing duration corresponds to a time between when a user first visits a webpage and either purchases the product or service or stops visiting the webpage. For instance, browsing duration 212 may correspond to a browsing duration for a user respective to webpage 108. Thus, browsing duration 212 may correspond to an amount of time between when the user first visited webpage 108 and when the user either purchased the product or service or stopped visiting webpage 108. Browsing duration 214 may correspond to a browsing duration for the same user respective to webpage 110 or for another user for any of the webpages 108, 110.

The browsing durations for each user respective to each website are used by the browsing duration module 210 to create browsing duration probabilities 216. As browsing durations are merely time frames, these durations are not easily used in a sales forecasting because sales forecasting is based on probabilities. Thus, the browsing durations are converted into browsing duration probabilities 216 in the following. The browsing duration probabilities 216 are indicative of likelihoods that users will purchase products or services associated with the webpages based upon the browsing durations determined from the browsing data 120.

To accomplish this for each product or service, users in the browsing data 120 are split into two groups: purchasers and window-shoppers based upon whether or not the users purchased the respective product. Next, two probability density functions are generated for the two groups of browsing durations for the users of those groups. Finally, based upon the two user groups and the probability density functions of browsing duration, browsing duration probabilities are calculated for each user based upon each user's respective browsing duration.

The sales forecasting module 124 also includes a combined probability module 218. The combined probability module 218 is implemented at least partially in hardware to combine the browsing ratio probabilities 208 and the browsing duration probabilities 216 into combined probabilities 220 for each user. The combined probabilities 220 define probabilities of users purchasing products or services associated with respective webpages based on browsing ratios and browsing durations. Although combined probabilities 220 are described, a sales forecast may also be based on browsing ratios or browsing durations, alone.

The combined probabilities 220 are used by a forecast estimation module 222 to produce the sales forecasts 126. The forecast estimation module 222 aggregates the combined probabilities 220 for each respective product or service of webpages 108,110 to produce sales forecasts 126 for the products or services. For example, combined probabilities 220 for users that have visited a webpage may be summated to produce a sales forecast for the product. This is described mathematically in greater detail in the following section.

Problem Formulation

Given website 104, let C be a set of users of client devices 112, 114 and let P be a set of products or services associated with webpages 108,110. A purchase candidate pair (hereinafter "pair") (c,p) is established where $c \in C$ and $p \in P$. For example, c represents a user of client device 112, and p represents a product or service associated with webpage 108.

A pair's transitional states are defined as ACTIVE and ADOPT. (c,p) becomes ACTIVE (c is interested in p) since c has visited p's webpage, then becomes ADOPT (c purchases p) since c has made an online order for p. After ADOPT state, the pair (c,p) returns to ACTIVE when c visits p's page again.

Given $p \in P$ and a subset $C_{ACTIVE(p,t)}$ of ACTIVE users associated with webpages for p at current time t, a sales forecast 126 $\sigma_{[t:t+\phi]}(p)$ can be defined as the cardinality of the subset of ACTIVE users reaching ADOPT state within a certain time period $\phi$ after t, i.e., $C_{ADOPT(p,[t:t+\phi])} \subseteq C_{ACTIVE(p,t)}$.

The sales forecast $\sigma_{[t:t+\phi]}(p)$ may be computed in a variety of ways, an example of which is through use of a Monte-Carlo simulation. A Monte-Carlo simulation allows the model to intake a limited set of variables that have some general probability estimates, e.g., browsing ratios and browsing durations. Based on those inputs, a statistically valid set of data is generated based on iterations that can be used to run probability calculations for a variety of possible scenarios, i.e., sales forecasts for different prediction times and different current times.

For each iteration, the pair (c,p) becomes ADOPT if the probability Pr(c,p) of a user c adopting a given product p is larger than a threshold $\theta_{c,p}$ assigned uniformly at random from 0 to 1. After k iterations, the expected value of $\sigma_{[t:t+\phi]}(p)$ is defined as a sales forecast 126 for product p.

Because social influence between users is not considered, sales forecast 126 for product p $\sigma_{[t:t+\phi]}(p)$ converges to $\Sigma_{c \in C_{ACTIVE(p,t)}} Pr(c,p)$ when $k \to \infty$.

Thus, a sales forecast for product p can be made by summating the probabilities Pr(c,p) for all of the active users respective of webpages associated with product p.

Forecast Model Setup

The probability Pr(c,p) is generalized as combined probability 220 to consider browsing data 120 $H^*_c$ (a set of page visit events of c and their metadata such as URL and visit time). Formally, combined probability 220 Pr(c,p) is defined as $Pr(ADOPT|H^*_c)$, quantifying adoption probability given browsing data 120 (The term 'ADOPT' represents that c purchases p). In particular, two predictive factors $H_{c,p}^1$ (Browsing Ratio) and $H_{c,p}^2$ (Browsing Duration) are identified for predicting the intention of $H^*_c$. These aspects are discussed below.

Figure 3:
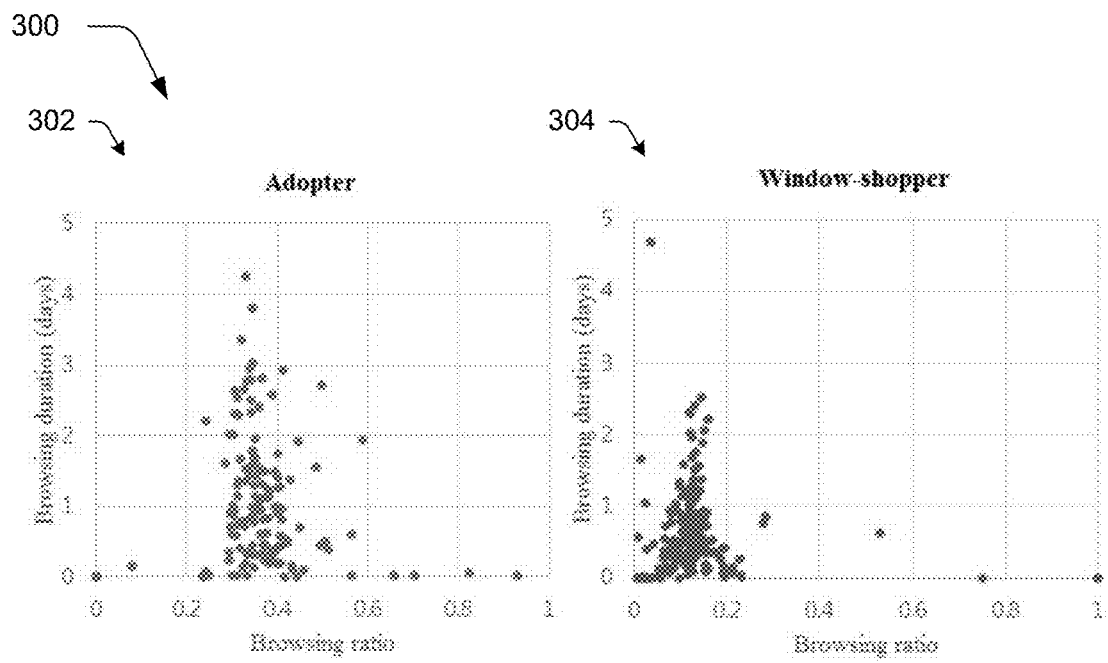
FIG. 3 depicts graphs of average browsing ratios and average browsing durations for adopters (purchasers) and window-shoppers (non-purchasers) for multiple products.
Figure 4:
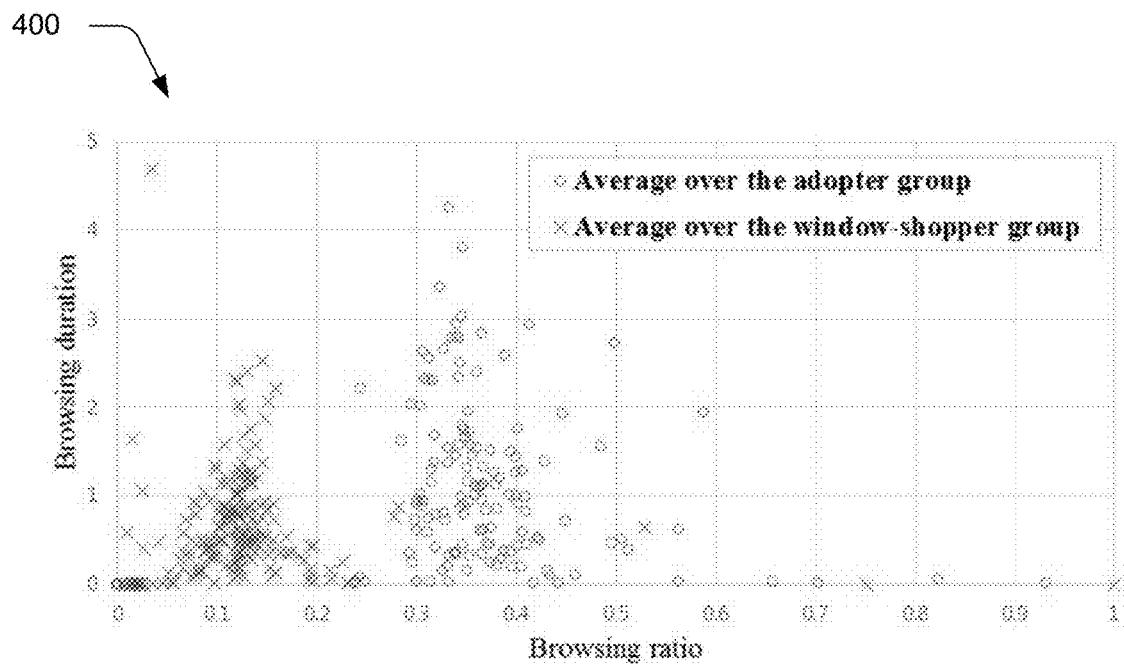
FIG. 4 depicts a graph of the average browsing ratios and average browsing durations from FIG. 3 overlaid on the same axes.

FIGS. 3 and 4 illustrate how adopters and window-shoppers can be distinguished using $H_{c,p}^1$ and $H_{c,p}^2$. FIG. 3 illustrates a graph 300 of average browsing ratios and browsing durations for a plurality of products. Adopter group graph 302 illustrates average browsing ratios and average browsing durations for products from users that are classified as adopters, i.e. users that purchased respective products. Window-shopper graph 304 illustrates average browsing ratios and average browsing durations for products from users that are classified as window-shoppers, i.e. users that did not purchase respective products. FIG. 4 illustrates the adopter group graph 302 and the window-shopper group graph 304 of FIG. 3 along the same set of axes. FIG. 4 clearly shows how adopters and window-shoppers can be separated and accounted for due to their clear differences in browsing ratios and browsing durations.

More formally, combined probability 220 Pr(c,p) is redefined as:

$$Pr(c,p) = Pr(ADOPT|H^*_c) \approx Pr(ADOPT|H_{c,p}^1, H_{c,p}^2) \quad (1)$$

Thus, combined probability 220 of adopting/purchasing product p by user c is a function of browsing ratio and browsing duration of user c respective to product p.

Browsing Ratio Probability Determination

Visited webpages indicate user interest in products or services. When visiting the webpages of p frequently, the user is more likely to adopt or purchase p. Otherwise, the user will visit other pages more often and be considered as a window-shopper. Thus, a browsing ratio is defined by the ratio $H_{c,p}^1$ as:

$$H_{c,p}^1 = \frac{V_{positive}}{V_{positive} + V_{negative}} \quad (2)$$

where $V_{positive}$ is times c visits p's webpages (i.e., visit frequency) and $V_{negative}$ is times c visits other webpages, while (c,p) is on ACTIVE state.

A browsing ratio is considered to be analogous to an adoption probability for the purposes of browsing ratio probability determination. Thus, a browsing ratio probability for a user can be considered as the browsing ratio $H_{c,p}^1$ for the user. Therefore, browsing ratios, such as browsing ratio 204 and browsing ratio 206, for a plurality of users that have visited p's webpages are converted directly to browsing ratio probabilities 208 $Pr(ADOPT|H_{c,p}^1)$.

Browsing Duration Probability Determination

While users tend to take from a few hours to a few days in browsing p's pages until adopting p, a large portion of window-shoppers quickly lose their interest regarding p. Using such a gap, users reaching ACTIVE before t are divided into two groups, $C_{ADOPT(p,<t)}$ of adopting p before t (namely adopter) and otherwise $C_{ACTIVE(p,<t)}$ (namely window-shopper).

Two probability density functions $X_{ADOPT}$ and $X_{ACTIVE}$ are created with regards to browsing durations 212, 214, which are defined as time periods from reaching ACTIVE state to reaching ADOPT state (for adopters) or to last visiting p's pages (for window-shoppers), respectively.

Based on the two user groups and the two probability density functions of browsing durations, a browsing duration probability 216 for a user is defined, given a browsing duration $H_{c,p}^2$ of (c,p), as:

$$Pr(ADOPT|H_{c,p}^2) \approx \frac{C_{positive}}{C_{positive} + C_{negative}} \quad (3)$$

where $C_{positive} = |C_{ADOPT(p,<t)}| \cdot Pr(X_{ADOPT} = H_{c,p}^2)$ and $C_{negative} = |C_{ACTIVE(p,<t)}| \cdot Pr(X_{ACTIVE} = H_{c,p}^2)$.

Forecast Model Refinement

As shown in FIGS. 3 and 4, browsing ratio and duration are not strongly dependent. Thus, the adoption probability for a user is approximately decomposed below to simplify the estimation of probability values.

$$Pr(ADOPT|H_{c,p}^1, H_{c,p}^2) = \frac{Pr(H_{c,p}^1, H_{c,p}^2|ADOPT)Pr(ADOPT)}{Pr(H_{c,p}^1, H_{c,p}^2)} = \quad (4)$$

$$\frac{Pr(H_{c,p}^1|ADOPT)Pr(H_{c,p}^2|H_{c,p}^1, ADOPT)Pr(ADOPT)}{Pr(H_{c,p}^1, H_{c,p}^2)} \approx$$

$$\frac{Pr(H_{c,p}^1|ADOPT)Pr(H_{c,p}^2|ADOPT)Pr(ADOPT)}{Pr(H_{c,p}^1)Pr(H_{c,p}^2)} =$$

$$\frac{Pr(ADOPT|H_{c,p}^1)Pr(H_{c,p}^2|ADOPT)}{Pr(ADOPT)} =$$

$$\frac{Pr(ADOPT|H_{c,p}^1)Pr(ADOPT|H_{c,p}^2)}{Pr(ADOPT)}$$

Figures 5, 6:
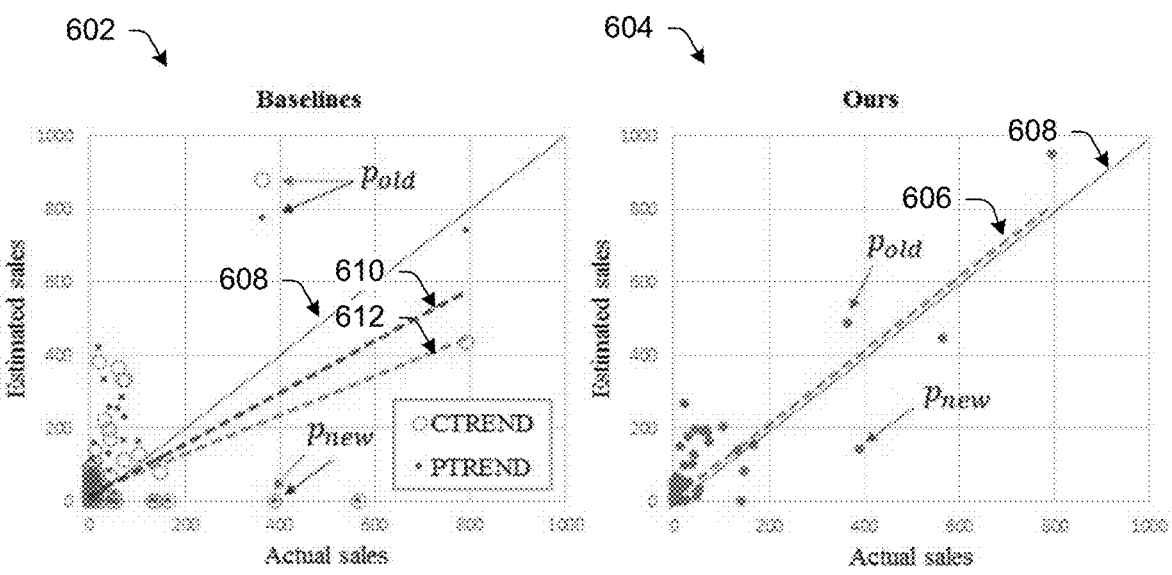
FIG. 5 depicts a combined probability equation in accordance with one or more implementations.
FIG. 6 depicts graphs of estimated sales using conventional techniques (left) and browsing ratios and browsing durations (right).

FIG. 5 depicts a combined probability equation 500 (equation 4 above) for a product or service associated with a webpage that is used in one or more embodiments. Equation 500 defines a combined probability 220 for a user for the product or service as a function of the browsing ratio probability 208 for the user, the browsing duration probability 216 for the user, and a constant value 502 defined as Pr(ADOPT). The constant value 502 is used to reduce the gap between actual sales and estimated sales, which can be trained by matching actual sales and estimated sales from time t–φ to t.

Forecast Model Evaluation

To evaluate the forecast model using browsing ratios and browsing durations, sales predictions are made. As a dataset, browsing data 120 of 276 phone products from a popular e-commerce site is collected. 4.6M users visited the products' webpages and 0.6B webpage visits occurred. Among these users, only 0.3M (6.5%) users purchased at least one product. As experiment parameters, a prediction period φ∈{1 month, 2 months} is set. For each φ, sales predictions with 20 different current time t(changing with a weekly cycle) are predicted. Finally, RMSE between actual sales and estimated sales are estimated for each product.

To compare the results using browsing ratios and browsing durations, two conventional techniques (baselines) are used to compute similar sales predictions. The first baseline, CTREND, learns Pr(c,p) as a maximum likelihood estimate, i.e. a fraction of times a customer became ADOPT over times the customer became ACTIVE. Since total sales of an e-commerce site have low variability (fluctuate slightly but recover quickly) according to different time, the second baseline, PTREND, learns $\sigma_{[t:t+\phi]}(p)$ is set as a number of adopters from t–$\phi$ to t, i.e., $\sigma_{[t:t+\phi]}(p)=|C_{ADOPT(p,[t-\phi:t])}|$ where $C_{ADOPT\ (p,[t-\phi:t])} \subseteq C_{ACTIVE(p,t-\phi)}$.

As a result, Table 1, shown below, shows that the RMSE of sales forecasts using browsing ratios and browsing durations is lower than that of both CTREND and PTREND in both 1 month and 2 month predictions. Also, the standard deviation of RMSE (in parentheses) and the performance gap ("gap") between two prediction periods are lowest in the model using browsing ratios and browsing durations.

TABLE 1

Average RMSE for Different Prediction Models

| Model | Prediction Period | | Gap |
|---|---|---|---|
| | 1 Month | 2 Month | |
| CTREND | 39.7 (±19.2) | 99.8 (±20.9) | 60.1 |
| PTREND | 56.1 (±19.0) | 80.7 (±18.3) | 24.6 |
| Browsing Ratio and Browsing Duration | 32.7 (±10.6) | 54.5 (±12.0) | 21.8 |

FIG. 6 depicts graphs comparing how closely estimated sales of products (points within the graphs) tracked actual sales using conventional techniques CTREND and PTREND 602 and using browsing ratios and browsing durations 604. Dotted lines are trend lines representing trends for the sales predictions of the products. It is clear from graph 604 how closely the trend line representative of sales forecasts using browsing ratios and browsing durations 606 follows an optimum prediction 608. In comparison, graph 602 shows how far the trend lines using CTREND 610 and PTREND 612 are off from the optimum prediction 608.

FIG. 6 also contrasts how sales of newly added product are predicted in conventional techniques versus using browsing ratios and browsing durations. To illustrate, a new product ($p_{new}$) and an existing product ($p_{old}$) are marked. With conventional techniques, the adoption probability of $p_{new}$, or $\sigma(p_{new})$, is underestimated to near-zero, while that of $p_{new}$ is overestimated. Such gaps are more reasonable in graph 604, which shows that prediction results of all products (including $p_{new}$ and $p_{new}$) using browsing ratios and browsing durations are more correlated with the trend line 606 as well as the optimum prediction 608.

Example Procedures

Figure 7:
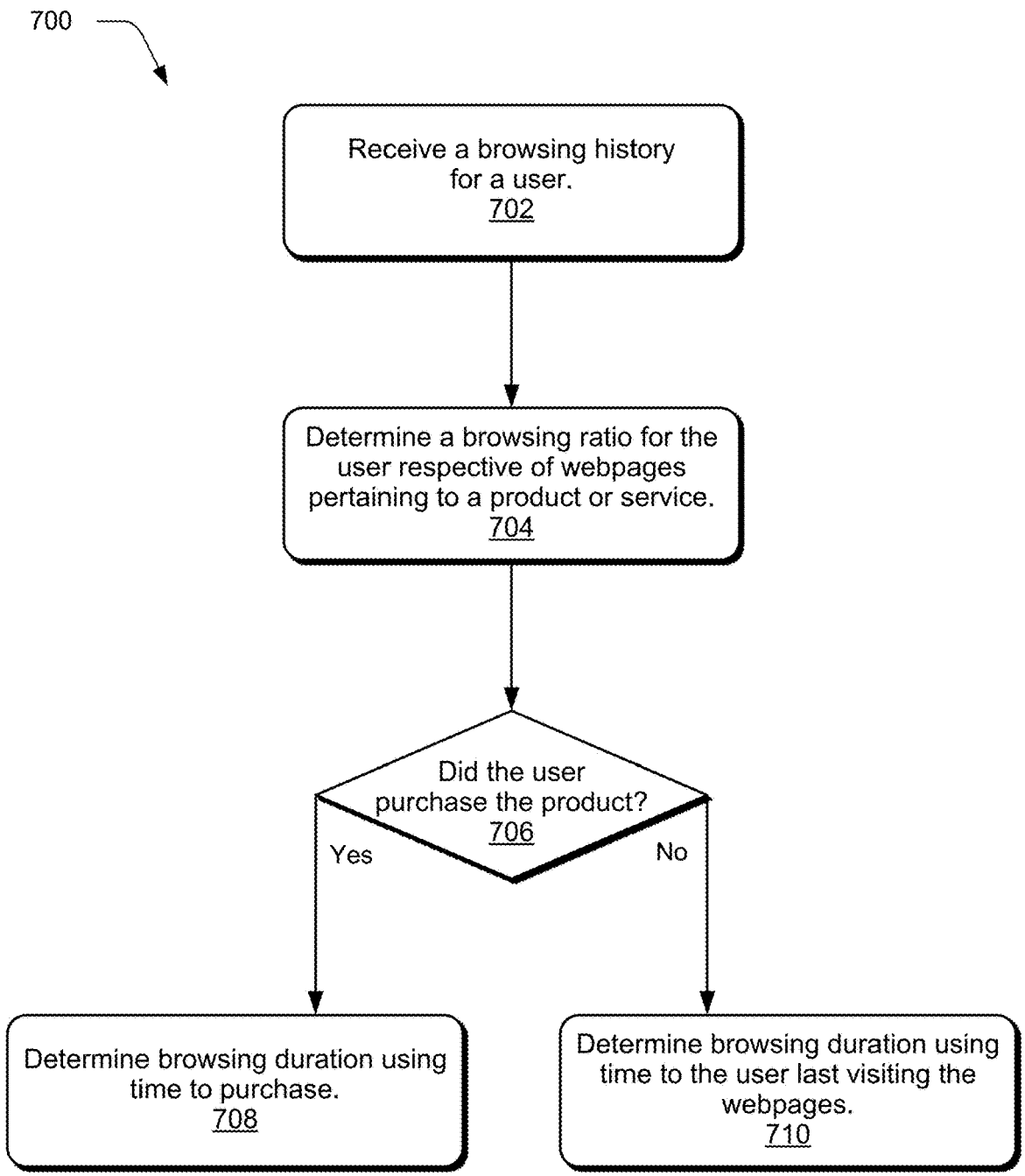
FIG. 7 is a flow diagram depicting a procedure in an example implementation in which a browsing ratio and a browsing duration are calculated for a user.

FIG. 7 is a flow diagram depicting a procedure 700 in an example implementation in which a browsing ratio and a browsing duration are determined for a user that has visited a webpage associated with a product or service. At 702, browsing data specific to the user received. The browsing data may contain histories of webpage visits by the user including numbers of webpage visits, times of webpage visits, whether or not the user purchased the product, and the like.

At 704, a browsing ratio for the user is determined relative to the product or service. The browsing ratio is determined by comparing a number of webpage visits that correspond to the product or service to a total number of webpage visits by the user.

At 706, it is determined whether the user purchased the product or service or did not. If the user purchased the product or service, the procedure continues to 708 where a browsing duration for the user is determined based on a time between when the user first visited a webpage associated with the product or service and when the user purchased the product. If the user did not purchase the product or service, the procedure continues to 710 where a browsing duration for the user is determined based on a time between when the user first visited a webpage associated with the product or service and when the user stopped visiting webpages associated with the product or service.

Figure 8:
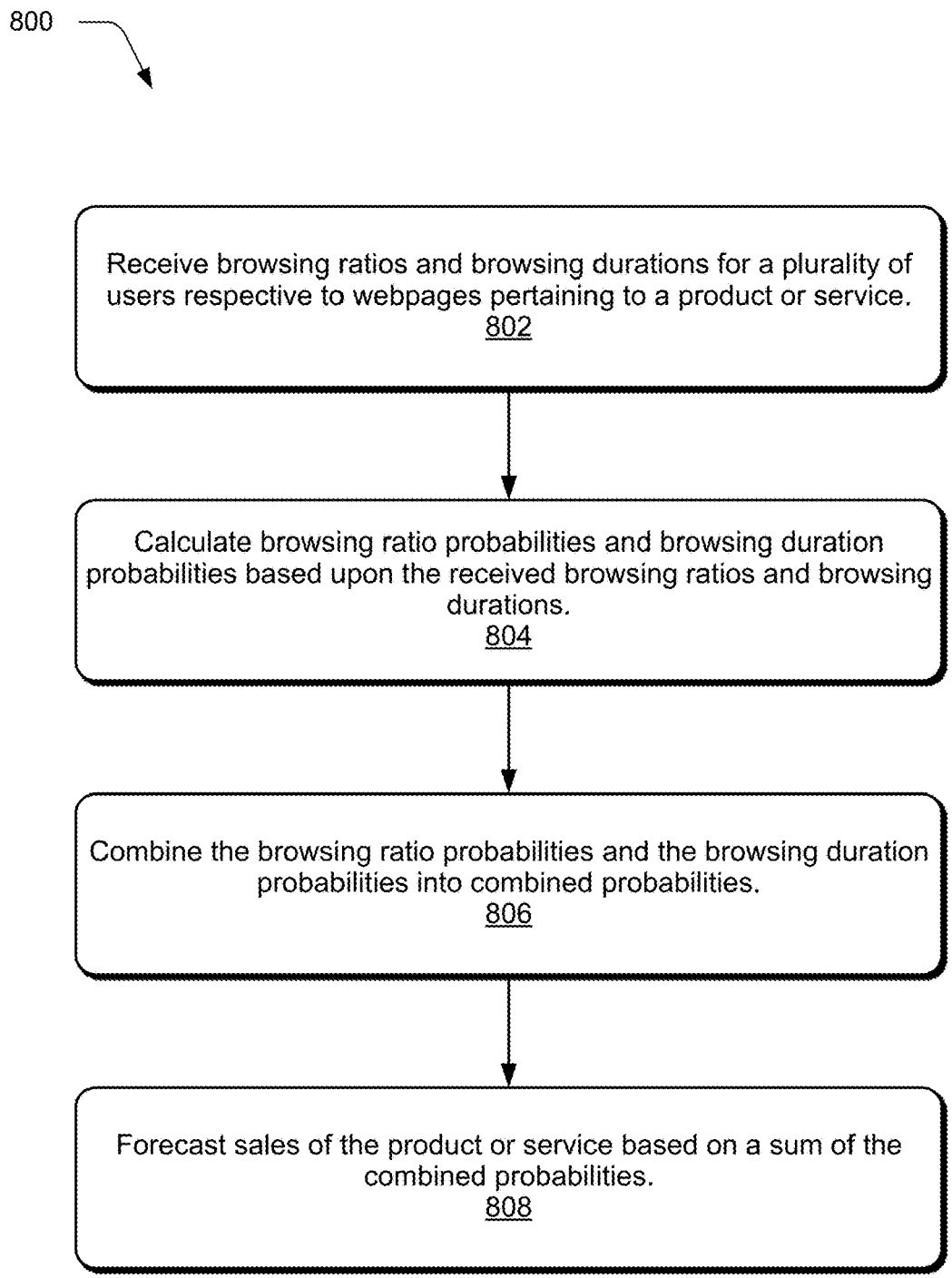
FIG. 8 is a flow diagram depicting a procedure in an example implementation in which browsing ratios and browsing durations are used to determine respective probabilities, combined into a combined probability, and used to forecast sales of a product.

FIG. 8 is a flow diagram depicting a procedure 800 of using browsing ratios and browsing durations for a group of users that have visited webpages associated with a product or service to determine a sales forecast for the product or service. At 802 browsing ratios and browsing durations, determined by the procedure 700, are received.

At 804, browsing ratio probabilities and browsing duration probabilities are calculated for each user respective to the product or service, as discussed with respect to FIG. 2 and sections "Browsing Ratio Probability Determination" and "Browsing Duration Probability Determination."

At 806, the browsing ratio probabilities and browsing duration probabilities are combined into combined probabilities for each user using the combined probability equation shown and discussed with respect to FIG. 5.

At 808, the combined probabilities for each user that has visited the webpages associated with the product or service are aggregated to forecast sales of the product in accordance with the section entitled "Problem Formulation." The aggregated probability is indicative of an estimated number of the products that will be sold.

Example System and Device

Figure 9:
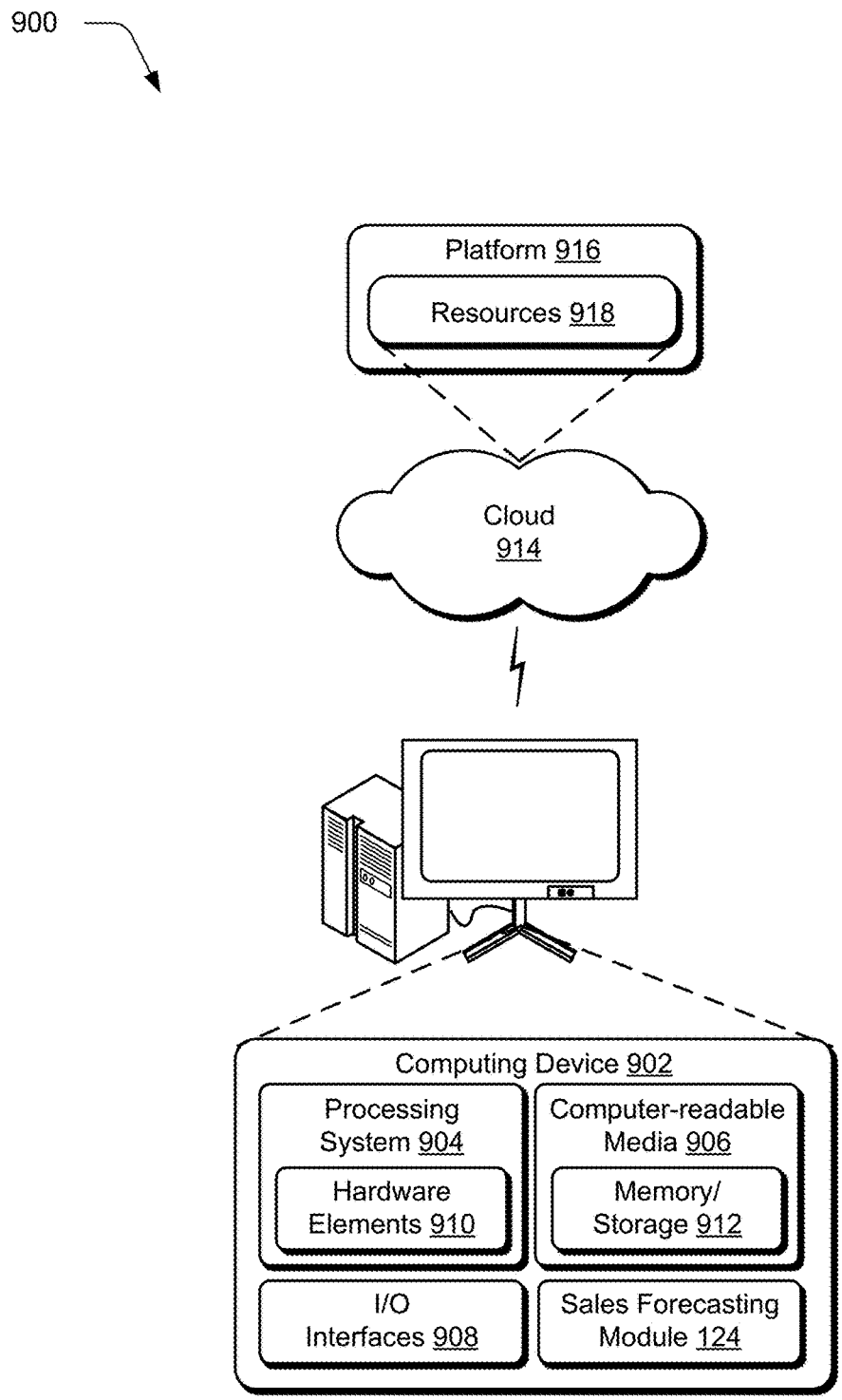
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the sales forecasting module 124, which may be configured to forecast sales of products. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to forecast product sales, a method implemented by at least one computing device, the method comprising:
   collecting, by the at least one computing device, browsing data that describes interaction of a plurality of users with a website, the website including a plurality of webpages, at least one webpage of the plurality of webpages pertaining to a particular product or service, the plurality of users including an active user with respect to the particular product or service that has visited the at least one webpage;
   determining, by the at least one computing device, a browsing ratio from the collected browsing data, the browsing ratio being a ratio of a number of visits to the at least one webpage of the website that pertains to the particular product or service and a number of visits to one or more webpages of the plurality of webpages that do not pertain to the product or service;
   measuring, by the at least one computing device, a browsing duration describing a time frame spent between a first visit to the at least one webpage pertaining to the particular product or service and a second visit to the at least one webpage pertaining to the particular product or service; and
   controlling, by the at least one computing device, a forecast of sales for the product or service by utilizing the browsing ratio and the browsing duration to predict a probability of the active user with respect to the particular product or service purchasing the particular product or service, the active user having visited the at least one webpage pertaining to the particular product or service.

2. The method as described in claim 1, wherein the browsing duration describes a time period between the first visit when the active user first visited the at least one webpage and the second visit when the active user stopped visiting the at least one webpage, and an additional time period between a first visit when an additional user described in the browsing data that has purchased the product or service first visited the at least one webpage and a second visit when the additional user purchased the product or service.

3. The method as described in claim 2, further comprising calculating, by the at least one computing device, browsing durations for an additional user described in the browsing data that has visited the at least one webpage and wherein the controlling is further based at least in part on the browsing durations for the additional user.

4. The method as described in claim 1, wherein the browsing ratio describes a ratio of a number of visits to the at least one webpage by the active user described in the browsing data and a total number of webpages that are visited by the active user.

5. The method as described in claim 4, further comprising calculating, by the at least one computing device, browsing ratios for an additional user described in the browsing data that has visited the at least one webpage and wherein the controlling is further based at least in part on the browsing ratios for the additional user.

6. The method as described in claim 1, wherein the particular product or service is a newly added product or service to the website.

7. The method as described in claim 1, further comprising repeating the determining, the measuring, and the controlling for another product or service to forecast sales relating to the another product or service based at least in part on another browsing ratio and another browsing duration calculated respective to webpages that are visited that pertain to the another product or service.

8. The method as described in claim 7, wherein the controlling the forecast of sales is further based on the other browsing ratio and the other browsing duration calculated respective to the another product or service.

9. The method as described in claim 1, wherein the controlling the forecast of sales is further based on a combined probability of the active user purchasing the particular product or service based upon the browsing ratio and the browsing duration.

10. The method as described in claim 8, wherein the controlling the forecast of sales is further based on a constant trained by comparing actual sales of the particular product or service to previously forecasted sales of the particular product or service.

11. In a digital medium environment to forecast sales of a product or service, a system comprising:
   a sales forecasting module implemented at least partially in hardware to forecast sales to an active user with respect to a particular product or service associated with a webpage of a website based at least in part on a plurality of browsing ratios and browsing durations, the sales pertaining to the particular product or service, the sales forecasting module comprising:
      a browsing ratio module implemented at least partially in hardware to determine the browsing ratios as ratios of a number of times each of a plurality of users, described in browsing data, visited the webpage associated with the particular product or service and a number of visits to other webpages of the website that do not pertain to the product or service; and
      a browsing duration module implemented at least partially in hardware to measure the browsing durations based on respective time frames spent by each of the users visiting the webpage associated with the particular product or service, each of the respective time frames describing a time frame between a respective first visit to the webpage associated with the particular product or service and a respective second visit to the webpage associated with the particular product or service.

12. The system as described in claim 11, wherein the browsing ratio module is effective to create browsing ratio probabilities of active users contributing to the sales based on the browsing ratios.

13. The system as described in claim 11, wherein the sales forecasting module further comprises a combined probability module, the combined probability module combining a plurality of browsing ratio probabilities and the browsing duration probabilities into combined probabilities that active users will contribute to the sales for use in the sales forecasting.

14. The system as described in claim 11, wherein the sales forecasting module is configured to use Monte-Carlo simulations to forecast the sales.

15. The system as described in claim 11, wherein the sales forecasting module is further configured to forecast sales of another product or service associated with another webpage of the website based at least in part on a plurality of other browsing ratios and other browsing durations determined and measured by the browsing ratio module and the browsing duration modules, respectively.

16. One or more computer-readable storage media comprising instructions stored thereon that, responsive to execution by a computing device, causes the computing device to perform operations comprising:

determining a browsing ratio with respect to browsing data received from a website that describes interaction of a plurality of users with webpages of the website, the website including a plurality of webpages, at least one webpage of the plurality of webpages pertaining to a particular product or service, the browsing ratio being a ratio of a number of visits to the at least one webpage that pertains to the particular product or service and a number of visits to webpages of the website that do not pertain to the particular product or service;

establishing a browsing duration from the received browsing data, the browsing duration describing a time frame spent between a first visit to the at least one webpage pertaining to the particular product or service and a second visit to the at least one webpage pertaining to the particular product or service; and forecasting sales for the particular product or service based at least in part on utilizing the browsing ratio and the browsing duration to predict a probability of an active user purchasing the product or service.

17. The one or more computer-readable storage media as described in claim 16, wherein forecasting the sales is further based on browsing ratios and browsing durations for a group of the users described in the browsing data that have visited the webpages that pertain to the particular product or service.

18. The method as described in claim 1, wherein the browsing duration describes a time period between when the active user first visited the webpages and when the active user subsequently visited the webpages.

19. The method as described in claim 1, wherein the controlling further includes determining a first probability density function associated with active users described in the browsing data, determining a second probability density function associated with adopting users described in the browsing data, and wherein the predicting the probability of the active user purchasing the particular product or service is based on at least one of the first and second probability density functions.

20. The method as described in claim 1, further comprising: controlling, by the at least one computing device, a forecast of sales for another product or service that is related to the particular product or service by determining a probability density function for the active user based on the browsing ratio and the browsing duration.

* * * * *